April 25, 1967 T. F. JONES ETAL 3,316,490

VARIABLE TIME DELAY CIRCUIT FOR PRODUCING PULSES OF PREDETERMINED WIDTH OR PULSES AFTER A PREDETERMINED INTERVAL

Filed Dec. 28, 1945

Inventors

THOMAS F. JONES

HORACE M. TRENT

By M. A. Hayes

Attorney

United States Patent Office 3,316,490
Patented Apr. 25, 1967

3,316,490

VARIABLE TIME DELAY CIRCUIT FOR PRODUCING PULSES OF PREDETERMINED WIDTH OR PULSES AFTER A PREDETERMINED INTERVAL

Thomas F. Jones and Horace M. Trent, Alexandria, Va. (both of Naval Research Laboratory, Anacostia Station, Washington, D.C. 20390)

Filed Dec. 28, 1945, Ser. No. 637,751
3 Claims. (Cl. 328—58)

Figure 1:
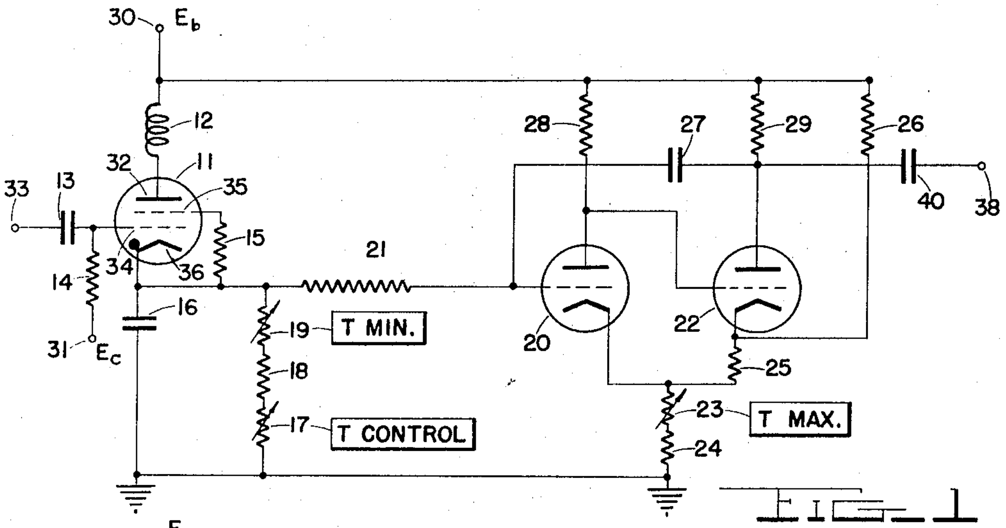

The invention described herein may be manufactured and used by or for the Government of the United States of America for governmental purposes without the payment of any royalties therefor.

This invention relates to an electronic circuit for producing pulses of prescribed duration, or for producing pulses at expiration of a certain time interval. One application of such circuits may be for preventing intensification of a cathode ray tube for a certain interval of time, in which case a pulse having a duration equal to the desired interval and of sufficient amplitude and proper polarity to cut off the cathode ray tube would be applied to its cathode or control grid. Another use of such a circuit would be the blanking of a cathode ray tube after the expiration of a certain interval, in which case a pulse of the necessary duration and of proper polarity and amplitude may be applied directly to the grid or cathode, or, as is often the case, a pulse may be delayed by a length of time equal to the prescribed interval before being applied to the grid or the cathode of the cathode ray tube.

In circuits for providing such delays and such pulses of a desired duration, and in particular if such delays are to be of a considerable length of time, various difficulties often are encountered in practice, one of the most troublesome of which may be fluctuation in the power supply voltage, which may seriously reduce the accuracy of the time delay produced. A situation of this sort can arise if the delay depends upon the charging of an energy storage element, the rate of charge of which is dependent upon the power supply voltage.

For a process that occurs with repetition, subsequent processes may have to be delayed accurately in respect to the instant of commencement. If the initiating process keys a delay circuit, a pulse may be produced with the desired accurate delay in order to key in turn other processes in the operation. It may be desired to bring processes to a certain state of development, and then to return the system to the original state, the state of development being the same in every case. If the delay is one that involves charging of an energy storage element, the rate of charge of which depends on the power supply voltage, then it will be apparent that the stage of development will not be the same in every case. For some purposes a variable element of this circuit to control the delay may be desirable, in which case, the calibration of the delay control should be accurate, and independent of the variations that may occur in supply voltage.

It is often very desirable to have an accurate delay take place with the keying pulses which initiate the delay arriving in random time distribution. It may be that with variation in the delay control in some known manner, variable delays will be associated with random keying pulses, in a known manner. The invention has the feature that the delay, if fixed, is independent of whether the keying pulses arrive with periodicity or in random time distribution; that for control of the delay in a desired manner, the delays may be varied in some known manner despite the random keying.

Generally speaking, the invention relates to variable time delay circuits providing an output pulse, the leading edge of this pulse occurring at the time a trigger or keying pulse is applied to the circuit, and the trailing edge being delayed in time. The duration of this delay may be determined according to the setting of a suitable calibrated control provided in the circuit. For this action there are two pulse generating networks; the second of which produces the output pulse and has only two stable states, and the first controls the operation of the second by applying to it a time-varying voltage. The time during which the time varying voltage is maintained above a certain margin at the input terminals of the second pulse generator is the delay. When this potential margin is reached, the transition from one stable state to the other in the second pulse generator network will take place.

One object of this invention is to provide an electronic circuit which will produce a sharp voltage change, or marker, at a time $T_0+T$, where $T_0$ is the instant of application of a trigger pulse to the circuit, and T is a predetermined time set on a control element of the circuit, whereby production of the marker at the time $T_0+T$ will be independent of the condition of the circuit at the initial time $T_0$.

Another object is to provide an electronic circuit which will produce a marker at $T_0+T$ as above described, wherein production of this marker will be at a time set on a calibrated control element, and in which accurate production of the marker will be obtained despite any large variations in the operating potentials of the voltage supply.

Still another object of the invention is to provide a variable time delay circuit, accurate operation of the circuit being obtained despite variations of supply potential and independently of the previous history of the circuit at the time from which the delay is started.

Still another object of the invention is to provide a gating circuit, the width of the gate or pulse being controllable, accurate production of the gate according to the calibration of the control being obtained despite large variation in the supply voltage and independently of the condition of the circuit at the initial instant of keying the gate.

Figures 2, 3:
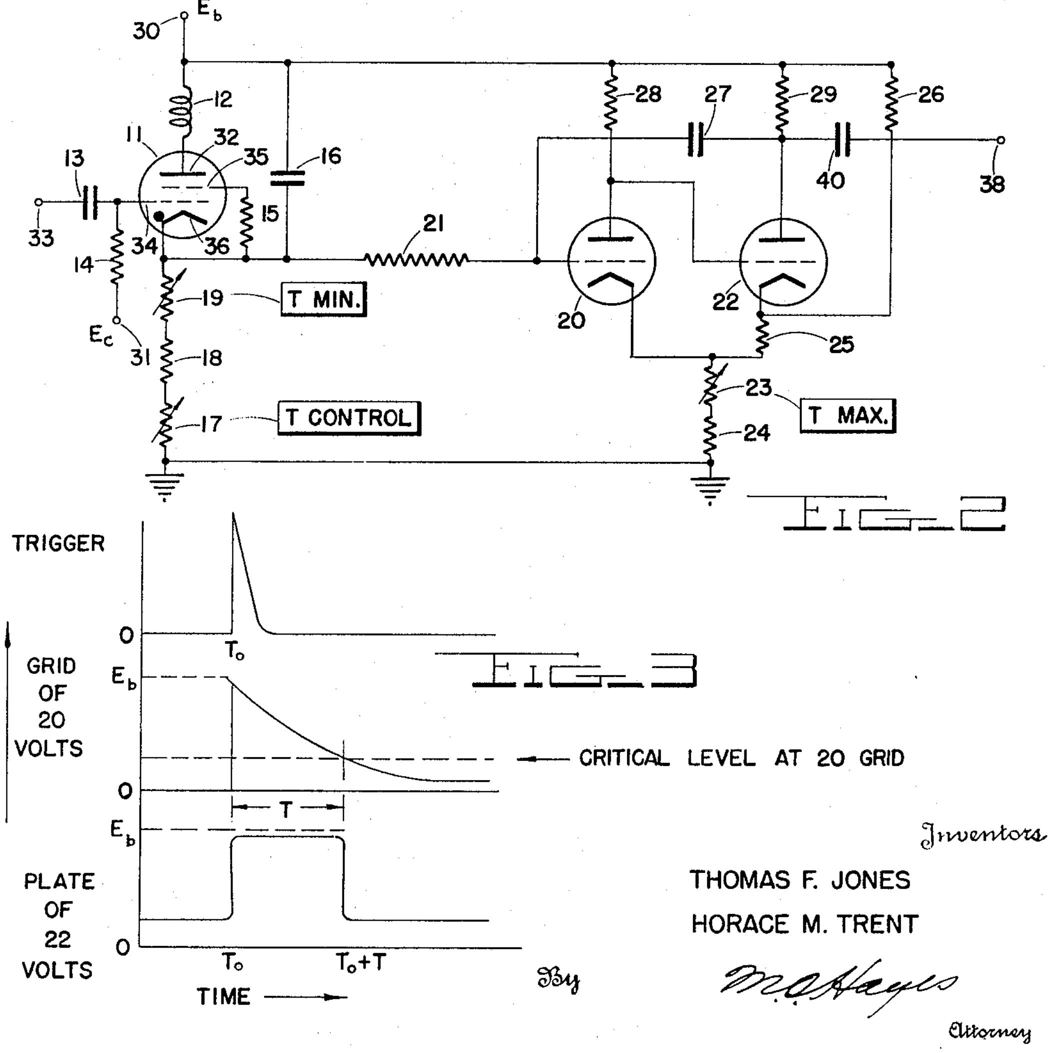

FIG. 1 is a schematic circuit of one embodiment of the invention, FIG. 2 is a schematic circuit of another embodiment of the invention, and FIG. 3 depicts waveforms useful in analyzing the operation of the circuits of the first and second embodiment.

Referring to the embodiment of the circuit shown in FIG. 1, there is applied at terminal 30 a high voltage $E_b$, and at terminal 31 a bias voltage $E_c$. Tube 11 is a gas tetrode, the plate 32 of which is connected to terminal 30, and hence the high voltage $E_b$, through inductor 12. Trigger pulses of short duration are supplied at input terminal 33, and applied to the control grid of gas tube 11 through condenser 13, the control grid 34 being connected to the biasing potential $E_c$ through resistor 14, so that in the absence of a trigger pulse the grid 34 is at biasing potential $E_c$. The screen grid 35 and cathode 36 of gas tetrode 11 are connected through current limiting resistor 15. The cathode 36 of gas tube 11 is connected through condenser 16 to ground. In shunt with condenser 16 are three resistors 17, 18, and 19, serially connected, resistor 17 being the calibrated time T control, 18 a fixed resistor, and 19 a variable resistor provided for calibration adjustment of the minimum setting of T control 17. The cathode 36 of gas tetrode 11 is shown connected to the control grid of triode 20 through current limiting resistor 21. In this way the voltage across condenser 16 is applied to the control grid of triode 20, and brings triode 20 from a quiescent state of low conduction to a state of high conduction. Thus the condenser 16 and resistances 17, 18 and 19 constitute a voltage generating network furnishing a voltage varying with time and applied to the grid of triode 20.

Triode 22 is interchangeable with triode 20. Triodes 22 and 20 in this circuit have two stable states, the quiescent stable state being that in which triode 22 conducts heavily. There are two common cathode resistors 23 and 24, serially connected in the cathode circuit of triodes 20 and 22, the resistor 23 being variable and resistor 24 fixed, the resistor 23 providing calibration adjustment of the maximum setting of T control resistor 17. The cathode of triode 22 is connected to resistors 23 and 24 through resistor 25, while the cathode of triode 20 is connected directly to resistors 23 and 24. Resistor 26 connects the cathode of triode 22 to terminal 30, i.e., to high voltage $E_b$, thus keeping the cathode of triode 22 at a higher potential level than the cathode of triode 20. The control grid of triode 20 is connected to the triode 22 plate through coupling capacitor 27. Triode 22 has its control grid connected to the plate of triode 20 directly. This connection, and the cathode circuit arrangement, establishes the quiescent stable state with triode 22 conducting heavily. The plate of triode 20 is connected to $E_b$, through resistor 28, while the plate of triode 22 is connected to $E_b$, through resistor 29. The output is taken from the plate of triode 22 through condenser 40, at terminal 38. This circuit is one of the well known "flip-flop" type and together with the resistances 23, 24, 25 and 29 provides a second voltage generating network operative to furnish an output pulse at 38 during maintenance of a given margin of input potential at the grid of triode 20 supplied from the first voltage generating network.

Gas tetrode 11 will be fired by application of a trigger pulse at time $T_0$, at input terminal 33. Before the triggering action, condenser 16 may be in any state of charge below a maximum limit, the maximum limit depending upon the minimum ionization potential of gas tetrode 11, and triodes 20 and 22 are in one or the other of the two stable conditions. Firing of gas tetrode 11 provides a low impedance path for charging condenser 16, and inductor 12 tends to bring the cathode potential of gas tube 11 near enough to the plate potential to extinguish the gas tube 11 very quickly. The inductor 12, which is almost critically damped to prevent an overswing which would depend upon the state of charge of condenser 16 at time $T_0$, limits the current through gas tube 11 to a safe value.

With gas tube 11 cut off, condenser 16 proceeds to discharge through 17, 18 and 19. The time constant of discharge is determined by the values of these resistors. The sharp rise in voltage across condenser 16 occasioned by condenser 16 quickly charging is coupled to the control grid of triode 20, causing the plate of triode 20 to drop sharply in potential. This drop coupled to the grid of triode 22 causes the plate of triode 22 to rise sharply and this rise is coupled to the grid of triode 20 through condenser 27.

This process is the transition from one stable state to the other, which will be maintained as long as the grid of triode 20 is held above a certain critical potential level. When the voltage at the grid of triode 20 reaches this critical potential, the other stable state in which triode 22 conducts heavily and its plate is at a low level will be in effect. The time $T_0+T$ is the instant at which this last transition takes place. The critical potential at the grid of triode 20 is determined substantially by the voltage division between resistors 23, 24, and resistors 25, and 26. This voltage division may be thought of as maintaining a margin of potential at the triode 20 grid, and as long as the potential applied to this grid is above the margin, the stable state in which triode 20 conducts heavily will be maintained. Resistor 23 is variable, and it determines the critical level, or margin of potential at the grid of tube 20, so that for maximum setting of resistor 17, resistor 23 can be adjusted for the maximum T desired. The voltage divider circuits 23, 24, 25 and 26 thus provide a control means for the second voltage generating network operative in dependency on variations in the common voltage source $E_b$ to control the margin of potential to which the second voltage generating network is responsive. Operation of the pulse generator circuit including tubes 20 and 22 should be on the linear portion of these tubes, characteristics, so that neither of the two tubes is ever altogether cut off.

If now the high voltage $E_b$, undergoes a large drop, say to ¼ its normal value, the gas tube 11 will fire normally, but now condenser 16 cannot charge to so high a potential. However, the critical level of the grid of tube 20 is proportionately reduced owing to the voltage division between resistors 23, 24 and resistors 25, 26; the calibration of resistor 17 is accordingly independent of this supply voltage change, for the time required for the potential at the grid of tube 20 to reach the critical level is now the same as when $E_b$ has its normal value.

It is seen from the account of operation of this embodiment of the invention that the only function of the trigger pulse is to instantaneously charge condenser 16. This makes the action of the circuit independent of the history of the circuit previous to the firing. That is to say, the same delay will be produced measured from the initial time of application of the trigger regardless of what has been done up to the time of application of the trigger. Thus the circuit functions normally with trigger pulses distributed at random in time, as long as the minimum separation in time is greater than the de-ionization time of gas tube 11.

In the second embodiment of the invention shown in the circuit of FIG. 2, condenser 16 is connected between the cathode of gas tube 11 and the high voltage supply, instead of from cathode to ground, as in FIG. 1. The initial state of condenser 16, before application of any trigger pulse to the control grid of gas tube 11, is that of charging to the high voltage $E_b$; the voltage at the grid of gas tube 20 is determined by the voltage across resistors 17, 18 and 19. When gas tube 11 is fired, condenser 16 discharges very quickly through the gas tube, and the potential across the resistors rises sharply. The gas tube 11 thus extinguishes for the same reason as before and the potential across the resistors decreases in the same manner as that across the condenser did for the circuit of FIG. 1. This embodiment, of FIG. 2, however, necessitates a more constant voltage supply than that required by the circuit of FIG. 1, for proper accuracy of operation Typical values for circuit elements, and tube types, for the embodiment of FIG. 1 reduced to practice, are as follows:

| | | |
|---|---|---|
| Inductor **12** | | 2 mh., 36 ohms. |
| Resistor: | | |
| **14** | ohms | 470,000 |
| **15** | do | 47,000 |
| **17** | do | 100,000 |
| **18** | do | 50,000 |
| **19** | do | 2,200 |
| **21** | megohms | 1 |
| **23** | ohms | 5,000 |
| **24** | do | 13,000 |
| **25** | do | 3,000 |
| **26** | do | 7,000 |
| **28** | do | 560,000 |
| **29** | do | 47,000 |
| Condenser: | | |
| **13** | microfarad | 0.001 |
| **16** | do | 6.0 |
| **27** | do | 0.001 |
| **40** | do | 0.02 |

Tubes 20, 22 may be any of types 6SL7, 6SN7, 6J5, as well as pentode types triode connected.

Gas tube 11 ........ type 2050

Tubes of different types may be used in the flip-flop circuit as triodes 20 and 22. For example, triode 20 may be of one type and triode 22 another, without materially affecting the operation of the invention.

It should be understood that variants of the flip-flop circuit, in which pentodes might be used, instead of triodes, are contemplated in the scope of the invention.

While certain specific embodiments of the invention have been shown and described herein for the sake of disclosure, it is to be understood that the invention is not limited to such specific embodiments but contemplates all such modifications and variants thereof as fall fairly within the scope and spirit of the appended claims.

What is claimed is:

1. A variable time delay circuit comprising a flip-flop circuit having first and second triodes, the plate of the first triode being connected directly to the grid of the second triode and the plate of the second triode connected through a condenser to the grid of the first triode, a storage condenser having one terminal connected to ground and the other terminal connected to the grid of the first triode through a grid current limiting resistor, resistors including a variable resistor connected in shunt with said storage condenser to form together a variable time constant circuit, a high voltage supply, a source of input trigger pulses, an inductor, a gas discharge tube having a grid-cathode circuit and an anode-cathode circuit, said grid-cathode circuit being connected to said source of trigger pulses and said anode-cathode circuit connected serially to said inductor to afford momentary connection of said storage condenser to said supply voltage responsive to said input trigger pulses, a resistor connecting cathodes of first and second triodes, a biasing resistor for the first tube connecting the cathode of the first triode to ground, and a resistor connecting said source of supply voltage directly to the cathode of said second tube.

2. A variable time delay circuit comprising a flip-flop circuit having first and second triodes, the plate of the first triode being connected directly to the grid of the second triode and the plate of the second triode connected through a condenser to the grid of the first triode, a source of high voltage supply, a gas discharge tube, an inductor connecting the plate of said gas discharge tube to the high voltage supply, a storage condenser having one terminal connected to the high voltage supply and the other to the cathode of said gas discharge tube, resistors including a variable resistor connected serially between the cathode of the gas discharge tube and ground, a resistor connecting cathodes of first and second triodes, a biasing resistor for the first triode connecting the cathode of the first triode to ground, a resistor connecting said source of supply voltage directly to the cathode of said second tube, and a grid-current limiting resistor connecting the cathode of said gas discharge tube to the grid of said first flip-flop circuit triodes.

3. A variable time delay circuit comprising a flip-flop circuit having first and second variable impedance devices, each of said devices having at least an input terminal, an output terminal and a control terminal, the output terminal of said first device being connected directly to the control terminal of said second device and the output terminal of said second device connected through a condenser to the control terminal of said first device, a high voltage supply having first and second terminals, a storage condenser having one terminal connected to one of said first and second terminals of said voltage supply, current limiting means connecting the other terminal of said storage condenser to said control terminal of said first device, variable resistance means connected in shunt with said storage condenser to form together a variable time constant circuit, a source of input trigger pulses, an inductor, a gas discharge tube having a grid-cathode circuit and an anode-cathode circuit, said grid-cathode circuit being connected to said source of trigger pulses and said anode-cathode circuit connected serially to said inductor to afford momentary connection of said storage condenser to said supply voltage responsive to said input trigger pulses, a resistor connecting the input terminal of said first and second devices, a biasing resistor for said first device connecting the input terminal of said first device to said first terminal of said voltage supply, and a resistor connecting said second terminal of said supply voltage source directly to the input terminal of said second device.

References Cited by the Examiner

UNITED STATES PATENTS

| | | | |
|---|---|---|---|
| 2,365,583 | 12/1944 | Nagel et al. | 250—36.17 |
| 2,402,916 | 6/1946 | Schroeder | 250—27 |
| 2,405,843 | 8/1946 | Moe | 250—27 |
| 2,419,546 | 4/1947 | Grieg | 250—27 |
| 2,422,696 | 6/1947 | Meacham | 250—27 X |

ARTHUR GAUSS, *Primary Examiner.*

JAMES L. BREWRINK, FREDERICK M. STRADER, *Examiners.*

L. MILLER ANDRUS, C. M. WHITMAN, L. N. DAVIS, S. D. MILLER, *Assistant Examiners.*